(12) United States Patent
Jehle et al.

(10) Patent No.: US 11,413,966 B2
(45) Date of Patent: Aug. 16, 2022

(54) CONTROL DEVICE AND METHOD FOR CONTROLLING THE OPERATION OF AN INTERNAL COMBUSTION ENGINE AND OF AN ELECTRICAL MACHINE IN A HYBRID VEHICLE

(71) Applicant: VITESCO TECHNOLOGIES GMBH, Hannover (DE)

(72) Inventors: Martin Jehle, Munich (DE); Andrew G Beckett, Munich (DE)

(73) Assignee: Vitesco Technologies GmbH, Hannover (DE)

(*) Notice: Subject to any disclaimer, the term of this patent is extended or adjusted under 35 U.S.C. 154(b) by 122 days.

(21) Appl. No.: 16/960,242

(22) PCT Filed: Jan. 2, 2019

(86) PCT No.: PCT/EP2019/050014
§ 371 (c)(1),
(2) Date: Jul. 6, 2020

(87) PCT Pub. No.: WO2019/134903
PCT Pub. Date: Jul. 11, 2019

(65) Prior Publication Data
US 2021/0061107 A1    Mar. 4, 2021

(30) Foreign Application Priority Data
Jan. 4, 2018 (DE) .............................. 102018200087

(51) Int. Cl.
*B60L 3/00* (2019.01)
*B60W 10/06* (2006.01)
(Continued)

(52) U.S. Cl.
CPC .......... *B60L 3/0084* (2013.01); *B60W 10/06* (2013.01); *B60W 10/08* (2013.01); *B60W 20/50* (2013.01);
(Continued)

(58) Field of Classification Search
CPC ......... B60L 3/0084; B60L 3/04; B60W 10/06; B60W 10/08; B60W 20/50; B60W 50/029;
(Continued)

(56) References Cited

U.S. PATENT DOCUMENTS 9,102,332 B2    8/2015  Vaz et al.
9,738,274 B2    8/2017  Mitsutani et al.
(Continued)

FOREIGN PATENT DOCUMENTS

CN       104295428 A       1/2015
DE    102012209191 A1     12/2013
(Continued)

*Primary Examiner* — Sizo B Vilakazi
(74) *Attorney, Agent, or Firm* — Laurence A. Greenberg; Werner H. Stemer; Ralph E. Locher

(57) ABSTRACT

A control device for controlling the operation of an internal combustion engine and of an electrical machine in a hybrid drive assembly, which permits a mechanical coupling of the engine and the machine in a drive train. An engine control part controls the internal combustion engine and an electrical machine control part controls the electrical machine. A monitoring part monitors proper operation of the control parts and, in the event of a malfunction, takes over a control function within a reaction time span. An engine false-start prevention part detects a transition of the internal combustion engine from stopped to running and, in the event of such a transition, checks if a proper start of the internal combustion engine was requested within a predefined past time span (Continued)

in order to prevent a fuel supply release and/or an ignition release if such a start was not requested.

13 Claims, 2 Drawing Sheets

(51) Int. Cl.
*B60W 10/08* (2006.01)
*B60W 20/50* (2016.01)
*B60W 50/029* (2012.01)
*F02D 41/06* (2006.01)
*F02N 11/08* (2006.01)

(52) U.S. Cl.
CPC ......... *B60W 50/029* (2013.01); *F02D 41/062* (2013.01); *F02N 11/0848* (2013.01); *B60W 2050/0295* (2013.01); *B60W 2510/0638* (2013.01); *B60Y 2200/92* (2013.01)

(58) Field of Classification Search
CPC ... B60W 2050/0295; B60W 2510/0638; F02D 41/062; F02D 41/22; F02N 11/0848; F02N 11/0866; F02N 2011/0888; F02N 2200/022; F02N 2300/2011; F02N 11/10; B60Y 2200/92; B60Y 2300/436; B60Y 2300/432; B60K 2006/268; F02P 11/00; Y02T 10/62

See application file for complete search history.

(56) References Cited

U.S. PATENT DOCUMENTS

| | | | |
|---|---|---|---|
| 2003/0006076 A1* | 1/2003 | Tamor | B60K 6/48 180/65.25 |
| 2005/0211479 A1* | 9/2005 | Tamor | B60W 20/00 180/65.25 |
| 2009/0157285 A1* | 6/2009 | Weiss | F02D 41/062 701/113 |
| 2016/0257302 A1 | 9/2016 | Mitsutani et al. | |

FOREIGN PATENT DOCUMENTS

| | | |
|---|---|---|
| DE | 102013214091 A1 | 1/2015 |
| JP | 2012025387 A | 2/2012 |
| JP | 2016164053 A | 9/2016 |
| JP | 2017124669 A | 7/2017 |

* cited by examiner

CONTROL DEVICE AND METHOD FOR CONTROLLING THE OPERATION OF AN INTERNAL COMBUSTION ENGINE AND OF AN ELECTRICAL MACHINE IN A HYBRID VEHICLE

BACKGROUND OF THE INVENTION

Field of the Invention

The present invention relates generally to the field of hybrid vehicles, in which, in a drivetrain, an internal combustion engine and an electric machine are permanently mechanically coupled or are at least temporarily mechanically couplable. In particular, the invention relates to a control device and to a control method. The control device for controlling the operation of an internal combustion engine and of an electric machine in a hybrid drive arrangement of a vehicle, which hybrid drive arrangement provides or permits a mechanical coupling of said two machines in a drivetrain, has:
- an engine control part for the control of the internal combustion engine, comprising at least control of a fuel feed enablement and possibly an ignition enablement of the internal combustion engine,
- an electric machine control part for the control of the electric machine, comprising at least control of an energization of the electric machine,
- a monitoring part which is designed to monitor proper operation of the engine control part and of the electric machine control part and, in the event of a malfunction being detected, to take over at least one control function of the engine control part and/or of the electric machine control part within a reaction period.

A control device of said type for controlling the operation of an internal combustion engine and of an electric machine in a hybrid drive arrangement of a vehicle, which hybrid drive arrangement provides or permits a mechanical coupling of said two machines in a drivetrain, has:
- an engine control part for the control of the internal combustion engine, comprising at least control of a fuel feed enablement and possibly an ignition enablement of the internal combustion engine,
- an electric machine control part for the control of the electric machine, comprising at least control of an energization of the electric machine,
- a monitoring part which is designed to monitor proper operation of the engine control part and of the electric machine control part and, in the event of a malfunction being detected, to take over at least one control function of the engine control part and/or of the electric machine control part within a reaction period.

In the case of a hybrid drive arrangement of said type, a start of the internal combustion engine (for example Otto-cycle engine or diesel engine) by means of the electric machine is basically and advantageously possible. Such an engine start process is typically demanded by the engine control part (or for example by a drivetrain control part which is superordinate to the engine control part and the electric machine control part), wherein the respective control part transmits for example a corresponding torque setpoint value or a start command to the electric machine control part.

It is however a problem that, in practice, a malfunction of the electric machine control part and/or for example of a current converter (inverter) used for the energization of the electric machine can result, even in the absence of a prior start demand (for a proper start of the internal combustion engine), in brief (non-demanded, erroneous) torque production by the electric machine, which, if mechanical coupling exists, can set the internal combustion engine in rotation, which in turn can then lead to an "unauthorized start and continued running of the internal combustion engine" even if the monitoring part subsequently (within the reaction period) stops the erroneous torque production by the electric machine.

An unauthorized start and continued running of the internal combustion engine is disadvantageously a safety risk, because, for example in closed spaces, exhaust gases which are harmful to health can accumulate.

It is to be considered here firstly that the intervention of the monitoring part generally, owing to the finite reaction period, occurs "too late" to prevent the start and continued running of the internal combustion engine, and secondly that, in the case of hybrid drive systems of the type of interest here, the engine control part generally provides that, at least in the case of an "activated ignition" (electrical supply to or operational readiness of the hybrid drive system), a fuel feed enablement and possibly (in the case of an applied-ignition internal combustion engine) also an ignition enablement occur above a predetermined minimum rotational velocity of the internal combustion engine.

The fuel feed enablement (for example injection enablement) and possibly ignition enablement even without a demand for a proper start of the internal combustion engine being initiated for example by a driver, but rather owing to an overshooting of the abovementioned engine minimum rotational velocity, is based on the fact that starting of the internal combustion engine should be possible in the case of a towed start or push-start of the vehicle with a closed drivetrain.

SUMMARY OF THE INVENTION

It is an object of the present invention, in the case of a control device and a control method of the type mentioned in the introduction, to eliminate the abovementioned safety risk.

According to a first aspect of the invention, said object is achieved, in the case of a control device of the type mentioned in the introduction, by means of an engine false start prevention part which is designed to identify a transition from a stationary state to a running state of the internal combustion engine and, in the event of such a transition being identified, to check whether a proper start of the internal combustion engine has been demanded within a predetermined period in the past in order, in the event of such a start not having been demanded, to prevent the fuel feed enablement and/or the ignition enablement for a predetermined engine interruption duration, wherein the engine interruption duration is at least as long as the reaction period.

If, during the use of a control device according to the invention, the engine false start prevention part identifies a transition from a stationary state to a running (rotating) state of the internal combustion engine without a start of the internal combustion engine having been demanded (for example an actuated start using the electric machine, or else for example using a "starter" (that is to say a further electric machine such as for example a "pinion starter") provided specifically for this purpose) within the predetermined period in the past, then the fuel feed (for example injection) and/or the fuel ignition (which is required depending on the design of the internal combustion engine) is prevented for a predetermined duration (engine interruption duration), such that, during this duration, the internal combustion engine can rotate but cannot "start up".

Since the engine interruption duration is at least as long as the reaction period, the monitoring part can then intervene in the erroneous control of the electric machine control part or inverter controller in good time and prevent the torque production by the electric machine, such that the internal combustion engine comes to a standstill again or for example reliably undershoots a rotational speed below which the engine control part for example no longer provides a fuel feed enablement in any case.

Advantageously, in the event of the abovementioned malfunction, although the internal combustion engine can be briefly set in rotation owing to the unauthorized torque production by the electric machine, said internal combustion engine cannot continue running in uncontrolled fashion, which thus eliminates the described safety risk.

A subtle advantage of the invention consists in that the function of the engine false start prevention part in no way opposes a desired start of the internal combustion engine by towed starting or push-starting of the vehicle because, after the engine interruption duration, which can typically be selected to be relatively short in relation to the typical duration of a towed starting or push-start operation, has elapsed, a start and continued running of the internal combustion engine is possible. The duration (engine interruption duration) without a fuel feed and/or possibly ignition, which is relatively short in practice, then does not constitute a problem in this usage situation.

The invention can be used for hybrid vehicles of a wide variety of different types, if the hybrid drive arrangement thereof provides the abovementioned mechanical coupling or at least a mechanical coupling capability (in certain operating states) between internal combustion engine and electric machine.

In this respect, the vehicle may in particular be a so-called parallel hybrid vehicle, for example with "mild hybrid architecture", for example "P0 hybrid" or for example "P1 hybrid", with (rotational) coupling, which is permanent or switchable (by means of a separating clutch), between internal combustion engine and electric machine. Such a hybrid drive arrangement which is suitable for the use of the invention may furthermore exist in the case of so-called "power-split hybrids".

In one embodiment, the internal combustion engine is an Otto-cycle engine (for example gasoline engine), in particular an Otto-cycle engine with fuel direct injection.

In another embodiment, the internal combustion engine is a diesel engine.

In one embodiment, the electric machine is a three-phase machine, which can preferably be operated by means of a bidirectional current converter (inverter) both in a drive mode for generating a drive torque in the drivetrain of the vehicle and in a generator mode for recuperating mechanical energy. Here, the current converter can be used, in the drive mode of the electric machine, as an inverter and, in the generator mode, as a rectifier, in order to supply the electric drive with power from a DC voltage source (for example lithium-ion battery or the like) and in order to effect the recuperation back into the DC voltage source.

In one embodiment, the control device is an electronic program-controlled control device. In this case, the control device has at least one processor unit (for example microcontroller) together with associated memory for storing a program which controls the operation of the processor unit.

In this respect, in the context of the invention, the control device may for example be a central program-controlled electronic control device (for example "ECU") (which is for example also provided in any case for other tasks), of the respective vehicle.

In the case of such a control device, it is accordingly possible for the engine control part, the electric machine control part, the monitoring part and/or the engine false start prevention part to each be implemented by means of software, or to each constitute a partial functionality of a program which is executed on the control device.

In one embodiment, the program-controlled electronic control device is however formed from multiple control units ("control modules") which are separate but which have a communicative connection to one another in the vehicle for example via a digital communication bus system (for example CAN bus, LIN bus or the like). In this case, each such control unit has a dedicated processor unit, preferably together with a dedicated memory unit for storing a program which controls the operation of the respective processor unit.

Here, it may in particular be provided, for example, that the engine control part and the electric machine control part are implemented by means of separate control units, wherein these two control units can for example communicate with one another and/or can for example each communicate with a superordinate drivetrain control unit.

As an alternative to a separate drivetrain control unit, it is for example also possible for a combination of the engine control part and of a drivetrain control part in one common control unit to be provided.

Similarly, the monitoring part may for example be implemented by means of a control unit which is provided specifically for this purpose and which has a communication link to the other control parts to be monitored. Alternatively, the monitoring part may however also be implemented in "distributed" form, for example as respective partial functionalities of those control parts or control unit(s) whose proper operation is to be monitored.

The monitoring part constitutes, as it were, a redundant monitoring level at least for the engine control part and the electric machine control part in order to ensure reliable operation of the overall system even in the event of a malfunction (for example owing to a RAM or ROM fault in a control unit) of a corresponding "normal function level".

Proper operation of a superordinate drivetrain control part (if present) is preferably also monitored by means of the monitoring part.

The execution of corresponding commands in said monitoring level (monitoring part) can be ensured by means of special safety mechanisms, the specific implementation of which may advantageously be based on prior art in this regard (for example so-called "watchdog" components or concepts).

For the takeover, when required, of a control function of the engine control part and/or of the electric machine control part by the monitoring part after detection of a malfunction, there are typically reaction times which may often be of the order of magnitude of several 100 ms.

In view of the fact that the reaction time after which the intervention of the monitoring level is ensured may vary in the specific fault situation, it is provided in one embodiment of the invention that a maximum reaction time that can be expected for the respective or relevant malfunctions is selected as the "reaction period".

In one embodiment of the invention, it is provided that the reaction period lies in a range from 10 ms to 600 ms.

In this context, it is to be noted that a reduction of the reaction period is associated with a greater or lesser amount of outlay or cost expenditure, but, with the use of the invention, this can advantageously be eliminated insofar as the function of the invention is, in effect, independent of the specific value of the reaction period. In this respect, the invention also advantageously contributes to a cost reduction.

In one embodiment, it is provided that the engine false start prevention part is furthermore designed to identify the transition from a stationary state to a running state of the internal combustion engine on the basis of an evaluation of a stored and continuously updated state value relating to a rotational velocity of the internal combustion engine.

In terms of its function, the engine false start prevention part can be regarded as a special constituent of the engine control part and, accordingly, can conveniently be implemented in one and the same control unit together with the other functionalities of the engine control part.

It is however not the intention to rule out the engine false start prevention part being implemented not as a constituent part of the engine control part and/or on the normal function level of the control device but rather for example as a partial functionality of the monitoring part (redundant monitoring level).

In one particularly advantageous embodiment, provision is made whereby the engine false start prevention part is provided both on the normal function level and also redundantly on the monitoring level. It is thus possible to ensure uninterrupted safeguarding by means of the monitoring level (for example in the event of a failure of the engine false start prevention part on the normal function level).

The control device itself, in particular for example a control unit by means of which the engine control part is implemented, may have a memory device in which the abovementioned state value relating to the rotational velocity of the internal combustion engine is stored and continuously updated. Alternatively, said memory device is provided so as to be separate from the control device but accessible via the abovementioned digital communication bus system.

The control device, or for example specifically the engine control part, is preferably designed to store and continuously update a multiplicity of state values relating to operation of the internal combustion engine (including for example the abovementioned state value relating to the rotational velocity of the internal combustion engine).

In one embodiment, the engine false start prevention part is furthermore designed to perform the check as to whether a proper start of the internal combustion engine has been demanded within a predetermined period in the past by means of a read-out from a memory in which demands for a proper start of the internal combustion engine are temporarily stored for at least said predetermined period.

The memory may in particular be the abovementioned memory device in which one or more state values relating to the operation of the internal combustion engine are also stored and continuously updated.

In one embodiment, the engine false start prevention part is furthermore designed to, in the case of an internal combustion engine with fuel injection, prevent an injection enablement during the engine interruption duration.

In one embodiment, the engine false start prevention part is furthermore designed to, in the case of an internal combustion engine with applied ignition, prevent an ignition enablement during the engine interruption duration.

In one embodiment, the engine interruption duration is selected in the range from 1.2 times to 20 times the reaction period, in particular in the range from 2 times to 10 times the reaction period.

It is thus reliably ensured that, already before the end of the engine interruption duration, the monitoring part can take over a respective control function of the engine control part and/or of the electric machine control part (in order to eliminate the malfunction).

In one embodiment, it is provided that the engine interruption duration amounts to at least 0.5 s, in particular at least 1 s.

In particular with regard to advantageously maintaining the possibility of being able to start the internal combustion engine by towed starting or push-starting of the vehicle, an embodiment is advantageous in which the engine interruption duration amounts to at most 5 s, in particular at most 3 s.

As already mentioned, the engine control part, the electric machine control part, the monitoring part and the engine false start prevention part are preferably implemented by software which is executed in one or alternatively in multiple inter-communicating control units, wherein said control units each have a processor unit together with associated memory unit. Here, one or more such memory units may constitute the abovementioned memory device in which the state values relating to the operation of the internal combustion engine, such as for example the state value relating to the rotational velocity of the internal combustion engine, are stored and updated.

In the case of such program-controlled electronic control units, it is expedient in practice to perform a so-called "warm reset" in predetermined exceptional situations or fault situations (for example a malfunction as a result of electromagnetic radiation), in the case of which warm reset the respective control unit is not completely set back into a defined initial state and restarted, but at least parts of the system are reset, with data being deleted in the process, and the operation of said parts is then continued.

Within the scope of the invention, in this context, the problem may arise that the identification, to be performed by the engine false start prevention part, of a transition from a stationary state to a running state of the internal combustion engine on the basis of an evaluation of the state value relating to a rotational velocity of the internal combustion engine cannot distinguish the case of an actual such transition from the case of an "apparent" such transition during normal operation of the internal combustion engine but "in the case of a prior warm reset" with deletion of the state value relating to the rotational velocity of the internal combustion engine.

In a further development of the invention, measures are therefore provided which, in the case of a warm reset of the control device, or of at least one program-controlled electronic control unit which implements the engine false start prevention part, in a situation with normal operation of the internal combustion engine, ensure the fuel feed and possibly ignition enablement in order to prevent the internal combustion engine from switching off (which in this case is not desired).

In such a refinement, provision is made whereby the engine false start prevention part is furthermore designed to read out the state value relating to the rotational velocity of the internal combustion engine from a "warm-reset-proof" memory area, whether this be a memory area implemented in the control device itself or a memory area (for example of another part of a vehicle electronic system) which has a communicative connection to said control device.

Because a running state of the internal combustion engine is stored, by means of the state value relating to the rotational velocity of the internal combustion engine, in a reset-proof memory area which is not deleted in the event of a warm reset, continued running of the internal combustion engine is advantageously made possible even after a warm reset. Specifically, the engine false start prevention part can then, even after the occurrence of a warm reset, correctly identify that the internal combustion engine was already running immediately before the initiation of the warm reset.

According to a further aspect of the present invention, a method for controlling the operation of an internal combustion engine and of an electric machine in a hybrid drive arrangement of a vehicle, which hybrid drive arrangement provides or permits a mechanical coupling of said two machines in a drivetrain, is proposed, having the steps:
  controlling the internal combustion engine, comprising at least controlling a fuel feed enablement and possibly an ignition enablement of the internal combustion engine,
  controlling the electric machine, comprising at least controlling an energization of the electric machine,
  monitoring correct control of the internal combustion engine and correct control of the electric machine and, in the event of a malfunction being detected, taking over at least one control function of the control of the internal combustion engine and/or of the control of the electric machine within a reaction period,
  wherein, according to the invention, the method furthermore comprises:
    identifying a transition from a stationary state to a running state of the internal combustion engine,
    in the event of such a transition being identified, checking whether a proper start of the internal combustion engine has been demanded within a predetermined period in the past, and
    in the event of such a start not having been demanded, preventing the fuel feed enablement and/or the ignition enablement for a predetermined engine interruption duration which is at least as long as the reaction period.

The embodiments and particular configurations described here for the control device according to the invention may analogously also be provided, individually or in any desired combination, as embodiments or particular configurations of the control method according to the invention.

For example, in the case of the control method, it may be provided that the identification of the transition from a stationary state to a running state of the internal combustion engine is performed by evaluation of a stored and continuously updated state value relating to a rotational velocity of the internal combustion engine, and that the state value relating to the rotational velocity of the internal combustion engine is, for this purpose, read out for example from a warm-reset-proof memory area, in particular for example a memory area of a control device which is used for carrying out the method.

According to a further aspect of the invention, a vehicle having a hybrid drive arrangement is proposed, in the case of which an internal combustion engine and an electric machine are mechanically coupled or mechanically couplable in a drivetrain, wherein the control of the operation of the internal combustion engine and of the electric machine is provided using a control device and/or a control method of the type described here.

According to a further aspect of the invention, a computer program product is proposed, comprising program code which, when executed on a data processing device (for example program-controlled electronic control device of a vehicle), carries out a control method of the type described here.

The invention will be described in more detail below on the basis of an exemplary embodiment with reference to the accompanying drawings, in which, in each case schematically:

DETAILED DESCRIPTION OF THE INVENTION

Figure 1:
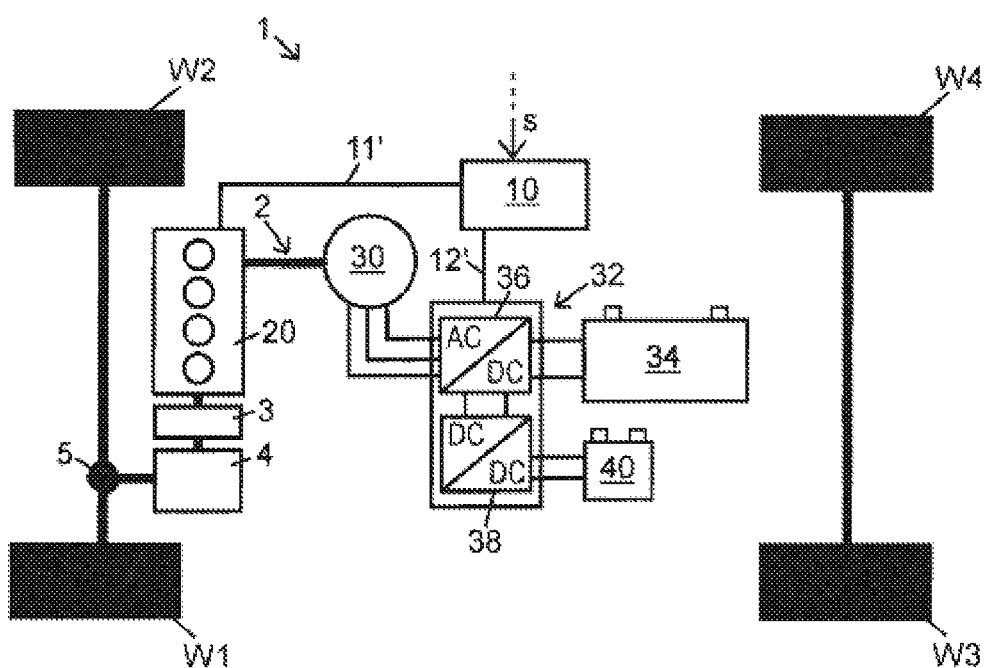
FIG. 1 shows a hybrid drivetrain of a vehicle according to an exemplary embodiment.

FIG. 1 shows a hybrid drive arrangement 1 of a vehicle, which in the illustrated example is equipped with two front wheels W1, W2 and two rear wheels W3, W4, wherein the hybrid drive arrangement 1 has an internal combustion engine 20 and an electric machine 30, which in this example are arranged, so as to be permanently coupled by means of a rotary shaft 2, in a drivetrain which leads to the front wheels W1, W2 of the vehicle. As illustrated, the drivetrain also comprises a clutch 3, a transmission (for example manual transmission) 4, and a differential transmission 5.

In the example, the internal combustion engine 20 is an Otto-cycle engine which is operable with gasoline as fuel and which has fuel injection.

Here, the electric machine 30 is a three-phase machine which can be supplied with electrical current from a battery 34 (for example lithium-ion storage battery) by means of a current converter device 32.

The current converter device 32 has a bidirectional DC/AC converter 36, by means of which energization of the electric machine 30 is performed, be it in a drive mode for generating a drive torque in the drivetrain or in a generator mode for recuperating mechanical energy from the drivetrain (for example during the braking of the vehicle).

In the illustrated example, the current converter device 32 furthermore has a bidirectional DC/DC converter 38, by means of which a further battery 40 (with a different nominal voltage than that of the battery 34) is incorporated into the on-board electrical system of the vehicle, such that a "further on-board electrical system" for a supply to further consumers (with a different nominal voltage) is created in this way.

For the control of the operation of the internal combustion engine 20 and of the electric machine 30, a control device 10 is provided which is configured as a program-controlled electronic control device and which, as symbolized in FIG. 1, is operatively connected by means of communication links 11' and 12' to the internal combustion engine 20 and to the current converter device 32 in order to perform these control tasks.

Via the communication links 11' and 12' (implemented for example as part of a digital communication bus system), it is possible for state values, detected for example by sensor means in the region of the internal combustion engine 20 and of the electric machine 30 (together with DC/AC converter 36) respectively, to be transmitted to the control device 10, and for control commands to be transmitted from the control device 10 to the controlled components 20, 30.

The control device 10 performs the control on the basis of specifications which arise from operator control commands or operator control actions from a driver of the vehicle (for example switching-on of an ignition/electrical supply, accelerator pedal actuation etc.) or which, in the case of an autonomous vehicle, are provided by a navigation system, as is symbolized in FIG. 1 by an "operator control/navigation specification signal" s fed to the control device 10.

If, for example, a particular drive torque of the drivetrain is commanded on the basis of such a specification by means of the signal s, the control device performs control processes suitable for this purpose in accordance with a hybrid drive strategy.

This includes in particular, for example, proper starting of the internal combustion engine 20 by virtue of the electric machine being energized in order to bring the internal combustion engine 20 into a running state.

Figure 2:
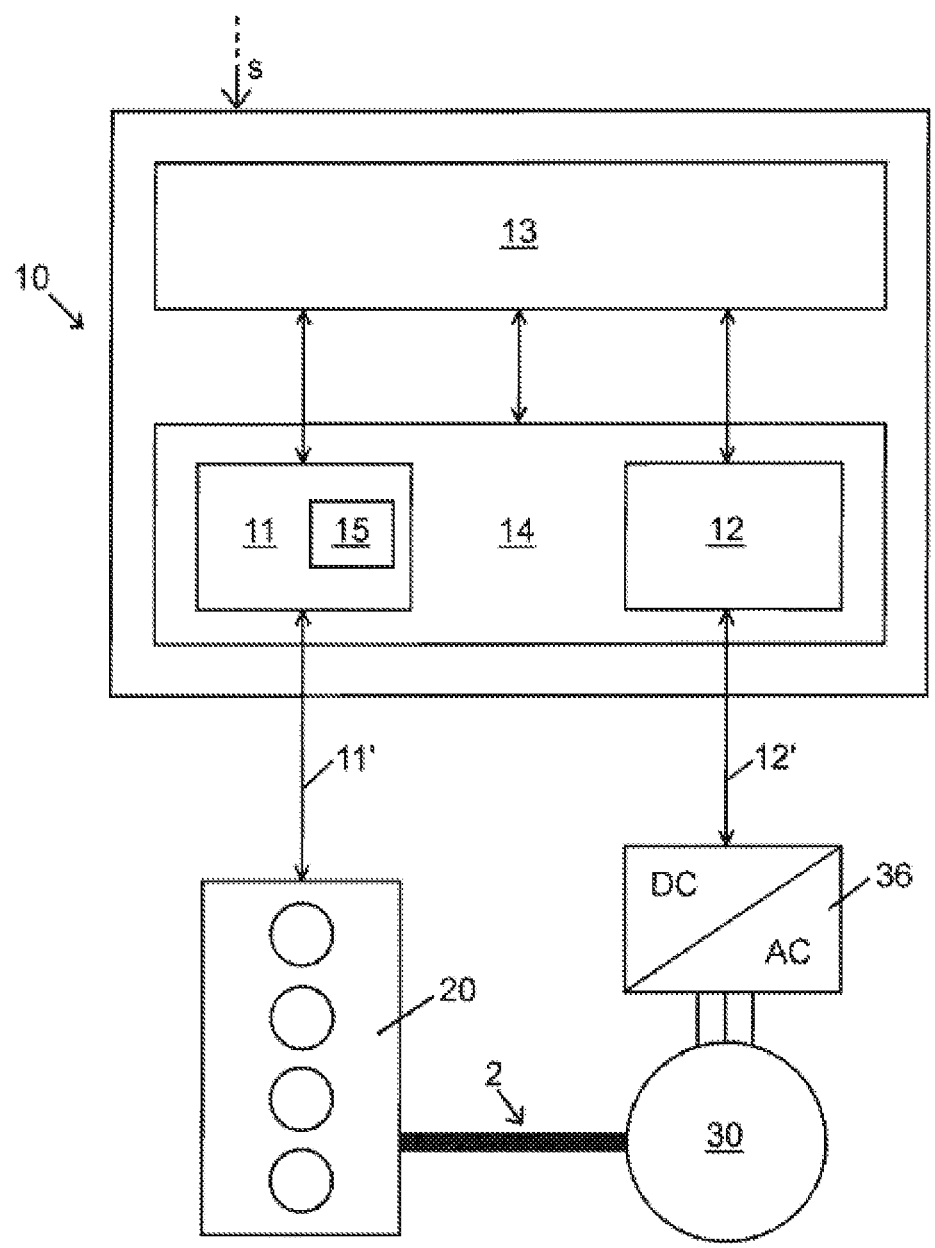
FIG. 2 shows a more detailed illustration of a control device used in the hybrid drive arrangement of FIG. 1.

FIG. 2 shows the construction of the control device 10 in somewhat more detail. Said control device has:
- an engine control part 11 for the control of the internal combustion engine 20, comprising at least control of a fuel feed enablement and possibly an ignition enablement of the internal combustion engine 20,
- an electric machine control part 12 for the control of the electric machine 30, comprising at least control of an energization of the electric machine 30,
- a monitoring part 13 which is designed to monitor proper operation of the engine control part 11 and of the electric machine control part 12 and, in the event of a malfunction being detected, to take over at least one control function of the engine control part 11 and/or of the electric machine control part 12 within a reaction period.

In the exemplary embodiment illustrated, the engine control part 11 and the electric machine control part 12 can be regarded as being subordinate to a drivetrain control part 14, or as components of said drivetrain control part 14, the task of which is to receive control commands from the driver (or alternatively, in the case of an autonomous vehicle, navigation commands), which commands are contained in the supplied specification signal s, and, on the basis of these, to generate, in accordance with the hybrid drive strategy, control commands for all actuatable components in the drivetrain, that is to say in particular the internal combustion engine 20 and the electric machine 30 (though these may also include for example the clutch 3, the transmission 4 and/or further drivetrain components which are not illustrated).

Here, control commands relating to the operation of the internal combustion engine 20 are processed by the engine control part 11 in order to output more specific control commands, such as in this case relating to an injection enablement and an ignition enablement, via the communication link 11' to the internal combustion engine 20 (to an interface device of the internal combustion engine 20, which is connected to respective actuators or sensors).

Control commands relating to the operation of the electric machine 30 are processed by the electric machine control part 12 in order to generate more specific control commands for the electric machine 30 or the associated DC/AC converters 36 thereof, and output said commands via the communication link 12'.

In the context of the control of the drivetrain performed by the drivetrain control part 14 (for example through specification of an acceleration or deceleration torque in the drivetrain), it is also possible for direct communication between the engine control part 11 and the electric machine control part 12 to be provided, for example a specification of torque setpoint values from the engine control part to the electric machine control part 12, which controls the operation of the electric machine 30.

The engine control part 11, the electric machine control part 12 and the drivetrain control part 14 collectively constitute, as it were, a "normal function level", whereas the monitoring part 13 constitutes a redundant monitoring level (protected by particular safety mechanisms) which monitors the engine control part 11, the electric machine control part 12 and also the drivetrain control part 14.

In the case of a malfunction of one of the monitored parts 11, 12 and 14 being detected, the monitoring part 13 takes over at least one control function of the engine control part 11 and/or of the electric machine control part 12 within a "reaction period".

One special feature of the control device 10 consists in that this has an engine false start prevention part 15 which is designed to identify a transition from a stationary state to a running state of the internal combustion engine 20 and, in the event of such a transition being identified, to check whether a proper start of the internal combustion engine 20 has been demanded within a predetermined period in the past in order, in the event of such a start not having been demanded, to prevent the fuel feed enablement and/or the ignition enablement for a predetermined "engine interruption duration", wherein the engine interruption duration is at least as long as the abovementioned reaction period.

It is thus advantageously possible for an "unauthorized start" of the internal combustion engine 20, for example owing to a malfunction of the electric machine control part 12 and/or of the associated DC/AC converter 36, to be prevented.

In the exemplary embodiment illustrated, the reaction times (until the withdrawal of the malfunction) of the monitoring part 13 lie in the range from approximately 100 ms to 300 ms, and, accordingly, the engine false start prevention part 15 provides a "reaction period" of for example 300 ms.

In this example, the "engine interruption duration" is selected to be 2 s, such that the period until the internal combustion engine 20 could "start up" if the fuel feed enablement and/or ignition enablement were not prevented is very reliably bridged, as it were, by the engine interruption duration. In the example illustrated, the injection enablement and the ignition enablement at the internal combustion engine 20 are prevented. The engine interruption duration for the prevention of the enablement, or the blocking, of ignition/injection in particular encompasses the period after which, after prevention of the torque generation of the electric machine 30, the engine rotational speed has reliably fallen again to an extent sufficient that ignition/injection would be deactivated in any case (for example at a rotational speed<50 rpm).

The engine false start prevention part 15 identifies a transition from a stationary state to a running state of the internal combustion engine 20 on the basis of an evaluation of a stored and continuously updated state value relating to a rotational velocity (for example "rotational speed") of the internal combustion engine 20. In the illustrated example, the rotational speed of the internal combustion engine 20 is continuously communicated via the communication link 11' to the control device 10, which stores and continuously updates this rotational speed in a warm-reset-proof memory area of the control device 10. Error-free identification is thus ensured even after a warm reset of the control unit (for example microcontroller device) which implements the engine false start prevention part 15.

The evaluation performed by the engine false start prevention part 15 could for example consist in checking whether a transition from a rotational speed of approximately zero (for example rotational speed lower than 50 rpm) to a rotational speed approximately corresponding to idling of the internal combustion engine (or higher) has occurred (for example rotational speed higher than 700 rpm in the case of nominal idling rotational speed of 900 rpm).

Since it is however generally the case in internal combustion engines that ignition and fuel injection are enabled already at a much lower rotational speed, and an internal combustion engine can subsequently run up "automatically" to idling rotational speed if combustion is possible, it is normally expedient for a rotational speed much lower than the idling rotational speed (for example less than 20% or even less than 10% of the respective idling rotational speed) to be used as a threshold for the identification of a running state of the internal combustion engine.

Against this background, in the example illustrated, the evaluation consists in checking whether, in the internal combustion engine 20, a transition from a rotational speed of approximately zero (for example rotational speed lower than 50 rpm) to a rotational speed of at least 50 rpm (or higher) has occurred.

The engine false start prevention part 15 performs the required check, as to whether a proper start of the internal combustion engine 20 has been demanded (for example by means of the specification signal s or for example by the drivetrain control part 14 or for example by the engine control part 11) within a predetermined period in the past, by means of a read-out from a memory in which such demands for a proper start are temporarily stored at least for the predetermined period.

This "predetermined period" should be selected to be at least as long as the period required by the internal combustion engine 20, proceeding from the stationary state, after a demand for a proper start, to arrive at the running state or to reach at least a rotational speed (in the example, 50 rpm) which, in the case of the discussed evaluation of the engine false start prevention part 15, is used as the identification threshold for the identification of a running state of the internal combustion engine 20. In the example illustrated, it is assumed (merely by way of example) that this is the case after typically 150 ms. Here, the predetermined period is set, with a certain safety margin (generally for example in the range from 1.2 times to 3 times the typical duration of the start process), at 250 ms.

In the exemplary embodiment illustrated, the monitoring part 13 is in particular also designed to monitor proper operation of the engine false start prevention part 15 and, in the specific case of a malfunction of the engine false start prevention part 15 being detected, to take over the control function thereof. The engine false start prevention part 15 on the normal function level (as a constituent part of the engine control part 11) is thus advantageously also implemented redundantly on the monitoring level.

In summary, according to the above exemplary embodiment, "temporary injection and/or ignition suppression" after a commencement of engine running in the absence of a prior start demand is used in order to rule out an unauthorized start or continued running of the engine despite an error reaction time of the monitoring part. As a result of the elimination of the injection and ignition suppression after a predefined duration (engine interruption duration), the possibility of an engine start by towed starting or push-starting of the vehicle is advantageously maintained. Preferably, the information regarding the state of a running engine is stored in a reset-proof memory area in order, after a warm reset, to identify the state of the previously running engine and, in this case, perform no suppression in the event of a running engine being identified.

In the case of a significant reaction time of the safety level, for example of a current converter (inverter) for the control of the energization of the electric machine, for example of the order of magnitude of approximately 100 to 300 ms, it would readily be possible, without the measure according to the invention, in the case of an inverter malfunction (for example with a fully activated maximum torque of the electric machine), for the internal combustion engine to reach a rotational speed at which the injection would normally be activated. With the aid of the invention, it is however possible to ensure a safe system function without the need for the technical outlay for reduced reaction times of the safety level (in particular of the inverter). This leads to a cost reduction (for example in the realization of the inverter).

LIST OF REFERENCE DESIGNATIONS

1 Hybrid drive arrangement
2 Rotary shaft (coupling)
3 Clutch
4 Transmission
5 Differential transmission
W1-W4 Vehicle wheels
s Operator control/navigation specification signal
10 Control device
11 Engine control part
11' Communication link
12 Electric machine control part
12' Communication link
13 Monitoring part
14 Drivetrain control part
15 Engine false start prevention part
20 Internal combustion engine
30 Electric machine
32 Current converter device
34 Battery
36 DC/AC converter
38 DC/DC converter
40 Further battery

The invention claimed is:
1. A control device for controlling an operation of an internal combustion engine and of an electric machine in a hybrid drive arrangement of a vehicle, wherein the hybrid drive arrangement provides or permits a mechanical coupling of the engine and the electric machine in a drivetrain, the control device comprising:
   an engine control part for controlling the internal combustion engine, the engine control part being configured to control a fuel feed enablement and, optionally, an ignition enablement of the internal combustion engine;
   an electric machine control part for controlling the electric machine, the electric machine control part being configured to control an energization of the electric machine;
   a monitoring part configured to monitor a proper operation of said engine control part and of said electric machine control part and, when a malfunction is detected, to take over at least one control function of said engine control part and/or of said electric machine control part within a given reaction period;

an engine false start prevention part configured to identify a transition from a stationary state to a running state of the internal combustion engine and, upon a transition being identified, to check whether a proper start of the internal combustion engine has been demanded within a predetermined period in the past in order, if the proper start has not been demanded, to prevent the fuel feed enablement and/or the ignition enablement for a predetermined engine interruption duration, wherein the engine interruption duration is at least as long as the given reaction period and lies in a range from 1.2 times to 20 times the given reaction period.

2. The control device according to claim 1, wherein the given reaction period lies in a range from 10 ms to 600 ms and the engine interruption duration is at least 0.5 seconds and no more than 5.0 seconds.

3. The control device according to claim 1, wherein said engine false start prevention part is configured to identify the transition from the stationary state to the running state of the internal combustion engine on a basis of an evaluation of a stored and continuously updated state value relating to a rotational speed of the internal combustion engine.

4. The control device according to claim 1, wherein said engine false start prevention part is configured to check whether a proper start of the internal combustion engine has been demanded within a predetermined period in the past by way of a read-out from a memory in which demands for a proper start of the internal combustion engine are temporarily stored for at least the predetermined period.

5. The control device according to claim 1, wherein the internal combustion engine is a fuel injected engine, and said engine false start prevention part is configured to prevent an injection enablement during the engine interruption duration.

6. The control device according to claim 1, wherein said engine false start prevention part is configured, if an ignition is applied in the internal combustion engine, to prevent an ignition enablement during the engine interruption duration.

7. The control device according to claim 1, wherein the engine interruption duration is at least 0.5 seconds and no more than 5.0 seconds.

8. The control device according to claim 7, wherein the engine interruption duration is at least 1 second and no more than 3 seconds.

9. The control device according to claim 3, wherein said engine false start prevention part is configured to read out the state value relating to the rotational speed of the internal combustion engine from a warm-reset-proof memory area of said control device.

10. A method for controlling an operation of an internal combustion engine and of an electric machine in a hybrid drive arrangement of a vehicle, wherein the hybrid drive arrangement provides or permits a mechanical coupling of the engine and the electric machine in a drivetrain, the method comprising:

controlling the internal combustion engine by controlling a controlling a fuel feed enablement and, optionally, an ignition enablement of the internal combustion engine;

controlling the electric machine by controlling an energization of the electric machine;

monitoring correct control of the internal combustion engine and correct control of the electric machine and, when a malfunction is detected, taking over at least one control function of the control of the internal combustion engine and/or of the control of the electric machine within a given reaction period;

identifying a transition from a stationary state to a running state of the internal combustion engine;

when the transition is identified, checking whether a proper start of the internal combustion engine has been demanded within a predetermined period in the past; and if the proper start has not been demanded, preventing the fuel feed enablement and/or the ignition enablement for a predetermined engine interruption duration which is at least as long as the given reaction period and lies in a range from 1.2 times to 20 times the given reaction period.

11. The method according to claim 10, which comprises identifying the transition from the stationary state to the running state of the internal combustion engine by evaluating a stored and continuously updated state value relating to a rotational speed of the internal combustion engine, and reading out the state value relating to the rotational speed of the internal combustion engine from a warm-reset-proof memory area of a control device that is used for carrying out the method.

12. A non-transitory computer program product comprising program code which, when executed on a data processing device, carries out the method according to claim 10.

13. The method according to claim 10, wherein the given period lies in a range from 10 ms to 600 ms and the engine interruption duration is at least 0.5 seconds and no more than 5.0 seconds.

* * * * *